June 19, 1928.
C. RABUT
1,674,223
CHUCK FOR HOLDING TWIST DRILLS AND SIMILAR DEVICES
Original Filed Nov. 19, 1920
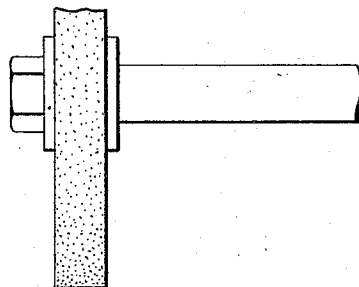
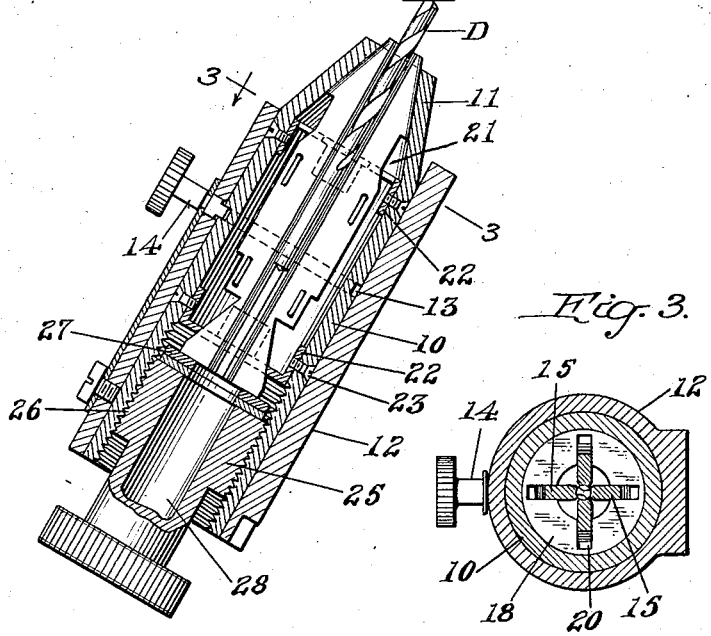
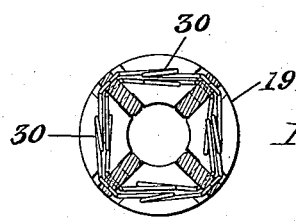
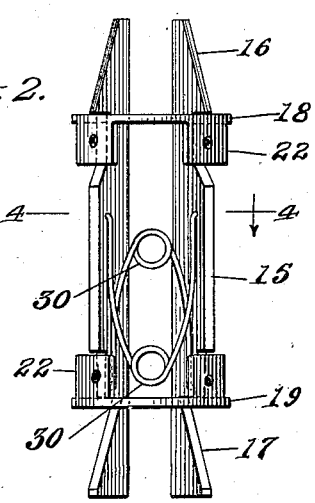
INVENTOR.
Charles Rabut
BY
Bohleber & Ledbetter
ATTORNEYS Patented June 19, 1928.

1,674,223

UNITED STATES PATENT OFFICE.

CHARLES RABUT, OF NEW YORK, N. Y.

CHUCK FOR HOLDING TWIST DRILLS AND SIMILAR DEVICES.

Original application filed November 19, 1920, Serial No. 425,035. Divided and this application filed January 6, 1923. Serial No. 611,013.

This invention relates to improvements in chucks and more particularly to a chuck for holding small elongated objects such as drills and the like.

It is an object of the invention to provide a chuck of the character specified which shall be simple in construction and will enable small elongated objects such as drills to be firmly held while being ground or sharpened.

Other objects are to provide a chuck construction which may be readily assembled and to provide a simple arrangement for opening and closing the jaws.

The above and other objects will appear from the detailed description taken in connection with the accompanying drawing forming part of this specification.

The present application is a division of a copending application Serial No. 425,035 filed Nov. 19, 1920, and now matured into Patent 1,524,672.

Referring to the drawing:

Fig. 1 is a longitudinal section through the improved chuck showing the same as held in a holder of a grinding machine and also showing the grinding wheel of the machine.

Fig. 2 is a view of the jaws assembly removed from the body of the chuck.

Fig. 3 is a cross section on line 3—3 of Figure 1.

Fig. 4 is a cross section on line 4—4 of Fig. 2.

In the drawings, 10 indicates a tubular chuck body or barrel having a conical end 11, the body being shown as received within a holder 12 constituting a part of a grinding machine. The chuck body is provided with an exterior annular groove 13 into which enters a spring-pressed pin 14 mounted on the holder 12. Upon freeing the pin from the groove the chuck body may be withdrawn from the holder.

The jaws of the chuck are indicated at 15 and are shown as four in number but it is within the spirit of the invention to use a lesser number, as for example three, or a greater number than four, depending on the size of the chuck. The jaws are beveled at one end as indicated at 16 to correspond to the conical end of the chuck barrel 10 and at the other end are provided with a corresponding bevel 17 in a parallel direction. The jaws are maintained in proper relation with respect to each other by means of two annular disks 18 and 19 each disk having radial slots 20 within which the jaws are movably received. The jaws, it will be noted, are of blade-like construction. The back of the jaws adjacent the front beveled portion 16 are desirably cut back as at 21 enabling the jaws to be opened to the full interior diameter of the barrel. For holding small articles such as drills, it is important to so locate the jaws that any one of them is located diametrically opposite another so as to minimize breakage, the preferred number of jaws in such case being four.

Both disks 18 and 19 are provided with axially extending flanges 22 into which enter suitable securing means which extend through the chuck body as indicated at 23. This manner of holding the jaws in assembled relation is very simple and allows them to be inserted within the chuck body very readily.

The jaws are closed upon the object to be held, illustrated as a drill D, by means of a flat-ended screw generally indicated at 25, said screw cooperating with internal thread 26 in one end of the chuck body. Between the screw and adjacent ends of the jaws may be placed one or more annular members 27. The screw is preferably hollow as indicated at 28 to permit a long drill or similar object to be held in the chuck with minimum exposure of the end to be sharpened or otherwise treated.

Coacting with the jaws and tending to spread them apart are springs 30 preferably of the safety-pin type, the terminals of whose arms are anchored in recesses in the sides of the adjacent jaws as clearly shown in Figs. 2 and 4, a pair of such openings being preferably provided between adjacent jaws. Springs of this type are readily made from available material and are readily replaced in case of breakage.

What I claim is:

1. In a chuck, a plurality of elongated jaws, a plurality of annular disks having radial slots within which the jaws are movably confined, a chuck body within which the jaws and disks are operatively disposed, means for rigidly securing said disks within said body, beveled portions at both ends of said jaws, one set of beveled ends adapted to coact with the adjacent end of the barrel to cause the jaws to approach each other, the opposite set of beveled ends adapted to coact with the walls of the slots in the adjacent disk for the same purpose, and movable means in the end of the barrel adapted to abut the adjacent ends of the jaws for moving them lengthwise in the barrel.

2. In a chuck, a plurality of elongated blade-like jaws, a pair of radially-slotted annular disks within the slots of which the jaws are movably confined, a barrel within which the disks are rigidly confined in spaced relation, a cone-shaped end on said barrel against which the adjacent ends of the jaws are adapted to be moved axially of the barrel toward its conical end to advance said jaws inwardly, means for also moving the other ends of the jaws inwardly at the same time comprising inclined surfaces on the jaws adapted to coact with the walls of the slots in the adjacent disk, and movable means in the barrel adapted to abut the adjacent terminal of the jaws and move the latter towards the conical end of the barrel.

3. A chuck, comprising a plurality of elongated blade-like jaws any one of which is located diametrically opposite another jaw, a pair of radially-slotted annular disks within the slots of which the jaws are movably confined, a barrel within which the disks are rigidly confined in spaced relation, a cone-shaped end on said barrel with which the adjacent ends of the jaws are adapted to cooperate when the jaws are moved axially of the barrel toward its conical end to advance said jaws inwardly, means for also moving the other ends of the jaws inwardly at the same time comprising inclined surfaces on the jaws adapted to coact with the walls of the slots in the adjacent disk, and movable means in the barrel adapted to abut the adjacent terminals of the jaws and move the latter towards the conical end of the barrel.

In testimony whereof, I have hereunto set my hand.

CHARLES RABUT.